(12) United States Patent
Bristow

(10) Patent No.: US 11,407,691 B2
(45) Date of Patent: Aug. 9, 2022

(54) NEMATICIDAL COMPOSITION AND THE USE THEREOF

(71) Applicant: ROTAM AGROCHEM INTERNATIONAL COMPANY LIMITED, Hong Kong (CN)

(72) Inventor: James Timothy Bristow, Chai Wan (HK)

(73) Assignee: JIANGSU ROTAM CHEMISTRY CO., LTD., Jiangsu (CN)

( * ) Notice: Subject to any disclaimer, the term of this patent is extended or adjusted under 35 U.S.C. 154(b) by 0 days.

(21) Appl. No.: 15/531,318

(22) PCT Filed: Oct. 20, 2015

(86) PCT No.: PCT/CN2015/092263
§ 371 (c)(1),
(2) Date: May 26, 2017

(87) PCT Pub. No.: WO2016/086729
PCT Pub. Date: Jun. 9, 2016

(65) Prior Publication Data
US 2017/0341995 A1    Nov. 30, 2017

(30) Foreign Application Priority Data

Dec. 2, 2014 (GB) ..................................... 1421391

(51) Int. Cl.
| | |
|---|---|
| *C05G 3/60* | (2020.01) |
| *C05D 9/02* | (2006.01) |
| *A01N 47/24* | (2006.01) |
| *A01N 25/00* | (2006.01) |
| *A01N 43/50* | (2006.01) |
| *A01N 43/56* | (2006.01) |
| *A01N 43/90* | (2006.01) |

(52) U.S. Cl.
CPC ............... *C05G 3/60* (2020.02); *A01N 25/00* (2013.01); *A01N 43/50* (2013.01); *A01N 43/56* (2013.01); *A01N 43/90* (2013.01); *A01N 47/24* (2013.01); *C05D 9/02* (2013.01)

(58) Field of Classification Search
CPC . C05G 3/60; C05G 9/02; A01N 25/00; A01N 43/50; A01N 43/56; A01N 43/90; A01N 47/24; A01N 43/16; A01N 47/02; A01N 2300/00
See application file for complete search history.

(56) References Cited

U.S. PATENT DOCUMENTS

| | | | |
|---|---|---|---|
| 2007/0099963 A1 | 5/2007 | Schwarz et al. | |
| 2008/0254013 A1* | 10/2008 | Angst | A01N 37/44 424/93.46 |
| 2009/0099127 A1 | 4/2009 | Schwarz et al. | |
| 2010/0016156 A1 | 1/2010 | Voeste et al. | |

FOREIGN PATENT DOCUMENTS

| | | | |
|---|---|---|---|
| CN | 1654446 A | | 8/2005 |
| CN | 1868979 A | | 11/2006 |
| CN | 101125774 A | | 2/2008 |
| CN | 101186548 A | | 5/2008 |
| CN | 101299923 A | | 11/2008 |
| CN | 101891560 A | | 11/2010 |
| CN | 101906001 A | | 12/2010 |
| CN | 101906002 A | | 12/2010 |
| CN | 102515969 A | | 6/2012 |
| CN | 102718606 A | | 10/2012 |
| CN | 102771503 A | | 11/2012 |
| CN | 103351246 A | | 10/2013 |
| CN | 103351247 A | | 10/2013 |
| CN | 103449935 A | | 12/2013 |
| CN | 103553763 A | * | 2/2014 |
| CN | 103553763 A | | 2/2014 |
| CN | 103664413 A | | 3/2014 |
| CN | 104016815 A | | 9/2014 |
| CN | 104045476 A | | 9/2014 |
| CN | 104094961 A | | 10/2014 |
| CN | 104230583 A | | 12/2014 |
| TW | 200845904 A | | 12/2008 |
| WO | 2009137434 A2 | | 11/2009 |
| WO | 2012061288 A1 | | 5/2012 |

OTHER PUBLICATIONS

Product Data Sheet—Solubor (R), pp. 1-4. (Year: 2012).*
International Search Report regarding PCT/CN2015/092263 dated Jan. 20, 2016.
International Search Report for PCT/CN2015/092263 dated Jan. 20, 2016.
UK Search and Exam Report regarding GB1421391.2 dated May 29, 2015.
Conceição M. G., Lúcio D. E., Mertz-Henning M. L., Henning A. F., Beche M., Andrad F. A. Nov. 2016. Physiological and sanitary quality of soybean seeds under different chemical treatments during storage. Revista Brasileira de Engenharia Agricola e Ambiental, 20(11), pp. 1020-1024.

(Continued)

*Primary Examiner* — Abigail Vanhorn
(74) *Attorney, Agent, or Firm* — Dickinson Wright PLLC

(57) ABSTRACT

A composition is provided comprising as component (A) at least one insecticide; and as component (B) at least one fertilizer. The composition is effective in controlling nematodes and in promoting plant growth. The at least one insecticide is preferably selected from thiodicarb, abamectin, imidacloprid, fipronil and mixtures thereof. The fertilizer component preferably comprises one or more amino acids and one or more micronutrients. A method of controlling nematodes and/or promoting plant growth using a combination of component (A) and component (B) is also provided.

37 Claims, No Drawings

(56) References Cited

OTHER PUBLICATIONS

Taiwanese Office Action corresponding to Application No. 104139823 dated Jun. 12, 2019.
Chinese Office Action corresponding to Application No. 201580064553.6 dated Apr. 30, 2019.

* cited by examiner

NEMATICIDAL COMPOSITION AND THE USE THEREOF

This application is a 371 national phase entry of PCT/CN2015/092263 filed 20 Oct. 2015, which claims benefit of GB Application No. 1421391.2, filed 2 Dec. 2014, the entire contents of which are incorporated herein by reference for all purposes.

BACKGROUND

1. Technical Field

The present invention relates to a nematicidal composition. The present invention also relate to a method of preventing, controlling and combating nematodes and improving growth of plants and/or plant parts, including applying to the plants and/or their locus the aforementioned composition.

Nematodes are small worms which are almost transparent and invisible to the naked eye. Nemotades are generally from 0.3 to 3.0 millimeters in length. Although nematodes are small in size, they cause about 12% of the annual losses to agricultural production, which corresponds to millions of dollars in lost crops (SASSER & FRECKMAN, 1987). Nematodes typically feed on the roots or shoots of plants. They reduce absorption and transportation of water and nutrients. A range of plants can be host to nematodes, including such crops as sugarcane, soybean, corn, coffee and cotton. Nematodes attack in the field in the form of spots/coppices and rarely spread throughout the field. The plants being attacked by nematodes may show symptoms of nutritional deficiency and reduced or slower development than healthy plants. Sampling and carrying out laboratorial analyses of soil and roots are required for confirmation of the existence of nematodes.

Current methods for controlling nematodes are very limited. One example of a commonly applied treatment is exposing infested soil to heat by the use of steam. However, steam treatment is technically difficult and costly for general application in the field.

Accordingly, there is a significant need for an improved technique for controlling nematodes in crops, in particular a nematicidal composition and a method of controlling nematodes, as well as other plant pests and pathogens. It would be an advantage if the nematicidal composition is easy to use and less costly to produce and employ than known treatment techniques.

SUMMARY

The present invention provides a nematicidal composition to control and combat nematodes.

It has now surprisingly been found that a composition comprising one or more insecticides and one or more fertilizer components exhibits high activity in controlling a wide range of nematodes, including *Pratylenchus zeae, Meloidogyne javanica, Pratylenchus brachyurus, Meloidogyne exigua, Meloidogyne incognita, Heterodera glycines*, and *Rotylenchulus reniformis* nematodes in plants. The composition may be used in the protection of a wide range of crops, such as sugarcane, soybean, corn, cotton and coffee. Moreover, it has been found that a composition of the present invention can improve the growth of plants and/or plant parts.

Accordingly, in a first aspect, the present invention provides a composition for controlling nematodes, the composition comprising as component (A) at least one insecticide; and as component (B) at least one fertilizer component.

In a further aspect, the present invention provides a method for controlling nematodes in plants at a locus, the method comprising applying to the locus (A) at least one insecticide; and (B) at least one fertilizer component.

In a still further aspect, the present invention provides the use of comprising (A) at least one insecticide; and (B) at least one fertilizer component in the control of nematodes.

In general, the present invention provides a method for controlling nematodes comprising applying to a plant, a plant part or surrounding thereof an effective amount of (A) at least one insecticide; and (B) at least one fertilizer component. The present invention is of particular use for controlling and combating *Pratylenchus zeae, Meloidogyne javanica, Pratylenchus brachyurus, Meloidogyne exigua, Meloidogyne incognita, Heterodera glycines, Rotylenchulus reniformis* in plants, plant parts and/or their surroundings.

It has also been found that the aforementioned combination of components (A) and (B) are active in improving the growth of plants or plant parts.

In another aspect, the present invention provides a composition for improving the growth of plants and/or plant parts, the composition comprising (A) at least one insecticide; and (B) at least one fertilizer component.

In a still further aspect, the present invention provides is a method of improving the growth of plants/plant parts comprising applying to the plants, plant parts and/or their surroundings (A) at least one insecticide; and (B) at least one fertilizer component.

The present invention also provides the use of (A) at least one insecticide; and (B) at least one fertilizer component to improve the growth of plants and/or plant parts.

DETAILED DESCRIPTION OF EXAMPLE EMBODIMENTS

"Plant" as used herein, refers to all plant and plant populations, such as desired and undesired wild plants, crop plants, and non-transgenic plants, and transgenic plants.

"Plant parts" as used herein, refers to all parts and organs of plants, such as shoots, leaves, needles, stalks, stems, fruit bodies, fruits, seeds, roots, tubers and rhizomes. Harvested material, vegetative and generative propagation material, for example cuttings, tubers, neristem tissue, rhizomes, offsets, seeds, single and multiple plant cells and any other plant tissue, are also included.

The word "surrounding" as used herein refers to the place at which the plants are growing, the place on which the plant propagation materials of the plants are sown or the place on which the plant propagation materials of the plants will be sown.

"Nematodes" as used herein refers to plant nematodes, that is plant parasitic nematodes that cause damage to plants. Plant nematodes encompass plant parasitic nematodes and nematodes living in the soil.

"Improving the growth" or "increase the growth" as used herein refer to a measurable amount of increased growth or yield of the plant or plant part over the growth of the same plant or plant part under the same condition, but without the application of the composition of the present invention. The plant yield can be measured as, for example, the yield of a product; plant weight; the fresh weight of the plant or any parts of the plant; the dry weight of the plant or any parts of the plant; specific ingredients of the plant including, without limitation, sugar content, starch content, oil content, protein content, vitamin content; leaf area; stem volume; plant height; shoot height; root length; the fresh matter of shoots; fresh matter of roots; or any other methods which are apparent to the person skilled in the art.

The composition of the present invention comprises (A) one or more insecticides. The one or more insecticides may be present in the composition in any suitable amount to provide the required nematicidal activity of the composition. The one or more insecticides are generally present in an amount of from about 1% to about 85% by weight of the composition, preferably from about 10% to about 75% by weight of the composition, more preferably from about 15% to about 70% by weight of the composition.

The one or more insecticides used in the present invention may be selected from a wide range of compounds having insecticidal activity. Preferably, the one or more insecticides are selected from oxime carbamates, avermectins, neonicotinoids and phenylpyrazole compounds. These insecticide compounds are known in the art and available commercially.

Suitable oxime carbamate compounds are known in the art. The invention may employ one or more oxime carbamates. The or each oxime carbamate compound is preferably selected from alanycarb, butocarboxim, butoxycarboxim, thiodicarb and thiofanox. Thiodicarb is a particularly preferred oxime carbamate compound for use in the present invention.

Suitable avermectin compounds are known in the art. The present invention may employ one or more avermectin compounds. The or each avermectin compound is preferably selected from abamectin and emamectin. Abamectin is a particular preferred avermectin.

Suitable neonicotinoid compounds are known in the art. The present invention may employ or more neonicotinoid compounds. The or each neonicotinoid compound is preferably selected from acetamiprid, clothianidin, dinotefuran, imidacloprid, imidaclothiz, nitenpyram, nitenpyram, nithiazine, paichongding, thiacloprid and thiamethoxam. Imidacloprid is a particularly preferred neonicotinoid compound.

Suitable phenylpyrazole compounds are known in the art. The present invention may employ one or more phenylpyrazole compounds. The or each phenylpyrazole compound is preferably selected from acetoprole, ethiprole, fipronil, flufiprole, pyraclofos, pyrafluprole, pyriprole, pyrolan and vaniliprole. Fipronil is a particularly preferred phenylpyrazole compound.

In one embodiment, the present invention employs a single insecticide. Preferred insecticides for use in such embodiments are oxime carbamates, in particular thiodicarb, and avermectins, in particular abamectin.

In an alternative embodiment, the present invention employs a plurality of insecticides. In one embodiment, two insecticide compounds are employed. In preferred embodiments, the insecticide employed comprises both an oxime carbamate, more preferably thiodicarb, and an avermectin, more preferably abamectin; or an oxime carbamate, more preferably thiodicarb, and a phenylpyrazole compound, more preferably fipronil; or an oxime carbamate, more preferably thiodicarb, and a neonicotinoid compound, more preferably imidacloprid.

Compositions comprising or methods employing an oxime carbamate, more preferably thiodicarb, are preferred embodiments.

The present invention further employs (B) one or more fertilizer components. The one or more fertilizer components may be present in the composition in any suitable amount, and are generally present in an amount of from about 1% to about 85% by weight of the composition, preferably from about 5% to about 75% by weight of the composition, more preferably from about 5% to about 65% by weight of the composition.

The fertilizer component contains no active nematicide, insecticide, herbicide and fungicide compounds.

The fertilizer component may comprise a wide range of components. Preference is given to fertilizer components selected from amino acids and micronutrients. In a preferred embodiment, the composition comprises a plurality of fertilizer components, preferably a combination of one or more amino acids and one or more micronutrients.

The one or more amino acids may be employed in any suitable amount, and are generally present in an amount of from about 5% to about 70% by weight of the fertilizer component, preferably from about 5% to about 40% by weight of the fertilizer component, more preferably from about 5% to about 20% by weight of the fertilizer component, and most preferably from about 10% to about 15% by weight of the fertilizer component.

In some embodiments, the amount of amino acids is equal to or more than 10% by weight of the fertilizer component.

The present invention may employ a wide range of amino acid compounds, including but not limited to alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine, L-Alanine, L-Arginine, L-Aspartic acid, L-Cystine, L-Glutamic acid, Glycine, L-Histidine, L-Isoleucine, L-Leucine, L-Lysine, L-Methionine, L-Phenylalanine, L-Proline, L-Serine, L-Threonine, L-Tyrosine, L-Valine.

The one or micronutrients may be employed in any suitable amount, and are generally present in an amount of from about 1% to about 30% by weight of the fertilizer component, preferably from about 1% to about 20% by weight of the fertilizer component, more preferably from about 5% to about 15% by weight of the fertilizer component.

In some preferred embodiments, the amount of micronutrients is equal to or more than about 4% by weight of the fertilizer component (B).

The composition and method of the present invention may employ a range of micronutrients. The micronutrients preferably comprise one or more ionic compounds, for example ionic compounds containing ions of metals of Groups IA, IB, IIA, IIB, IIIA, VIA, VIB, VIIA, VIIB, and VIII of the Periodic Table. Preferred ions include cobalt (Co), copper (Cu), iron (Fe), manganese (Mn), zinc (Zn), boron (B), halogens, preferably chlorine (Cl) and iodine (I), molybdenum (Mo), alkali metals, preferably potassium (K) and sodium (Na), and selenium (Se). Further preferred ions include sulphate, borates, polyphosphates, phosphates and nitrates. Suitable borates include perborates, pentaborates, triborates, tetraborates, octaborates and metaborates.

Preferably, the present invention employs a plurality of micronutrient compounds. More preferably, the present invention employs micronutrient compounds containing at least zinc, sulphate, sodium, and borate ions. More preferably still, the micronutrient compounds contain copper (Cu), iron (Fe), manganese (Mn), zinc (Zn), sodium (Na), sulphate, and borate ions.

Micronutrients can be in the form of salt. Suitable salts include anhydrous salts and/or hydrates. Examples of suitable salts includes, but are not limited to, cobalt sulphate, copper sulphate, iron sulphate, manganese sulphate, zinc sulphate, cobalt chloride, copper chloride, iron chloride, manganese chloride, zinc chloride, cobalt molybdate, copper molybdate, iron molybdate, manganese molybdate, zinc molybdate, cobalt nitrate, copper nitrate, iron nitrate, manganese nitrate, zinc nitrate, sodium borate, including sodium tetraborate, disodium tetraborate, borax, sodium pentaborate, sodium triborate, sodium metaborate, disodium octaborate and sodium perborate.

The fertilizer component (B) preferably comprises both a zinc salt and a boron salt. In such cases, the zinc and boron salts are preferably present in an amount of from about 1% to about 30% by weight of the fertilizer component (B), preferably from about 1% to about 20% by weight of the fertilizer component, more preferably from about 2% to about 10% by weight of the fertilizer component.

As noted above, the fertilizer component preferably comprises both one or more amino acids and one or more micronutrients. The amino acids and micronutrients together may be present in the fertilizer component (B) or employed in any suitable amount, and are generally present in a total amount of amino acids and micronutrients of from about 5% to about 95% by weight of the fertilizer component (B), preferably from about 10% to about 75% by weight of the fertilizer component, more preferably from about 10% to about 50% by weight of the fertilizer component, and most preferably from about 15% to about 40%.

The composition preferably comprises the micronutrient compounds in a total amount of at least 20 g/L, more preferably at least 50 g/L, still more preferably at least 75 g/L. Concentrations of micronutrients of about 100 g/L are suitable for many embodiments.

Particularly preferred micronutrients are those comprising one or both of a sodium borate, in particular disodium octaborate, preferably in the form of disodium octaborate tetrahydrate, and a zinc salt, in particular zinc sulphate.

In the preferred embodiment employing a sodium borate and a zinc salt, the sodium borate and zinc salt are preferably present in a weight ratio of from 1:6 to 4:1, more preferably from 1:5 to 2:1, still more preferably from 1:4 to 1:1. A weight ratio of about 1:3 is particularly preferred for many embodiments.

For example, in one embodiment, the composition comprises from 10 to 40 g/L of a sodium borate, more preferably from 20 to 30 g/L of a sodium borate, still more preferably from 24 to 28 g/L of a sodium borate. A preferred sodium borate is disodium octaborate.

Similarly, in one embodiment, the composition comprises from 50 to 100 g/L of a zinc salt, preferably from 60 to 90 g/L of a zinc salt, more preferably from 70 to 80 g/L of a zinc salt, still more preferably from 72 to 75 g/L of a zinc salt. A preferred zinc salt is zinc sulphate.

In one preferred embodiment, the composition comprises 25.5 g/L disodium octaborate and 73.5 g/L zinc sulphate.

In another preferred embodiment, the micronutrients comprise salts containing zinc, borate, copper, manganese and iron ions.

In one preferred embodiment, the composition comprises zinc salts in a concentration of from 5 to 30 g/L, preferably from 10 to 20 g/L, still more preferably from 15 to 20 g/L. A preferred zinc salt is zinc sulphate.

Similarly, in one preferred embodiment, the composition comprises a borate in a concentration of from 5 to 50 g/L, preferably from 10 to 30 g/L, still more preferably from 20 to 25 g/L. A preferred borate is disodium octaborate.

Similarly, in one preferred embodiment, the composition comprises an iron salt in a concentration of from 5 to 30 g/L, preferably from 10 to 25 g/L, more preferably from 15 to 25 g/L. A preferred iron salt is iron sulphate.

Similarly, in one preferred embodiment, the composition comprises a manganese salt in a concentration of from 5 to 50 g/L, preferably from 10 to 30 g/L, more preferably from 15 to 25 g/L. A preferred manganese salt is manganese sulphate.

Similarly, in one preferred embodiment, the composition comprises a copper salt in a concentration of from 5 to 30 g/L, preferably from 10 to 20 g/L, more preferably from 15 to 20 g/L. A preferred copper salt is copper sulphate.

In one preferred embodiment, the composition comprises 17.5 g/L zinc sulphate, 19.9 g/L iron sulphate, 24 g/L disodium octaborate, 23 g/L manganese sulphate monohydrate and 15.7 g/L copper sulphate.

In another preferred embodiment, the micronutrients comprise salts containing zinc, borate, copper, manganese and iron ions. In one preferred embodiment, the composition comprises salts in a concentration of 18 g/L zinc salt, 20 g/L iron salt, 24 g/L borate, 23 g/L manganese salt, and 16 g/L copper salt.

The amino acids and micronutrients together may be present in the composition in any suitable amount, and are generally present in a total amount of both amino acids and micronutrients of from about 5% to about 95% by weight of the composition, preferably from about 10% to about 75% by weight of the composition, more preferably from about 10% to about 50% by weight of the composition and more preferably still from about 15% to about 40% by weight.

In some embodiments, the fertilizer component used according to the present invention comprises (i) about 5% to about 40% of amino acids by weight of the composition; and (ii) about 1% to about 20% of micronutrients by weight of the composition.

In certain embodiments, the fertilizer component used according to the present invention comprises (i) equal to or more than 10% of amino acids by weight of the composition; and (ii) equal to or more than about 4% of micronutrients by weight of the composition.

In some embodiments, the fertilizer component used according to the present invention comprises (i) equal to or more than 10% of amino acids by weight of the composition; and (ii) equal to or more than about 4% of micronutrients by weight of the composition; wherein the micronutrients comprise zinc (Zn), sulphate, sodium (Na), and borate ions.

In certain embodiments, the fertilizer component used according to the present invention comprises (i) equal to or more than about 10% of amino acids by weight of the composition; and (ii) equal to or more than about 4% of micronutrients by weight of the composition; wherein the micronutrients comprises copper (Cu), iron (Fe), manganese (Mn), zinc (Zn), sodium (Na), sulphate, and borate ions.

The amino acids and micronutrients may be present in the composition or applied in any amounts relative to each other. In particular, the weight ratio of the amino acids and micronutrients as applied in the fertilizer component is preferably in the range of from about 20:1 to about 1:20 and from about 10:1 to about 1:10, more preferably from about 5:1 to about 1:5, from about 1.5:1 to about 1:1.5. In some embodiments, the weight ratio of the amino acids to micronutrients in the fertilizer component (B) or applied is about 1.2:1.

In some preferred embodiments, the compositions according to the present invention comprise or the method of the present in invention employs the following combinations of components:
 (A) thiodicarb and (B) fertilizer;
 (A) abamectin and (B) fertilizer;
 (A) thiodicarb and abamectin, and (B) fertilizer;
 (A) thiodicarb and imidacloprid; and (B) fertilizer; and
 (A) thiodicarb and fipronil; and (B) fertilizer.

The compositions and method of the present invention may be used in controlling a wide range of nematodes. In particular, the composition and the methods of the present invention may be applied in controlling nematodes, for example but not limited to:

*Pratylenchus zeae, Meloidogyne javanica, Pratylenchus brachyurus, Meloidogyne exigua, Meloidogyne incognita, Heterodera glycines, Rotylenchulus reniformis.*

The composition and method of to the present invention are suitable for the protection of plants of a wide range of crops, including cereals, for example wheat, barley, rye, oats, corn, rice, sorghum, triticale and related crops; fruit, such as pomes, stone fruit and soft fruit, for example apples, grapes, pears, plums, peaches, almonds, pistachio, cherries, and berries, for example strawberries, raspberries and blackberries; leguminous plants, for example beans, lentils, peas, and soybeans; sugarcanes; oil plants, for example rape, mustard, and sunflowers; cucurbitaceae, for example marrows, cucumbers, and melons; fibre plants, for example cotton, flax, hemp, and jute; citrus, for example calamondin, citrus citron, citrus hybrids, including chironja, tangelo, and tangor, grapefruit, kumquat, lemon, lime, mandarin (tangerine), sour orange, sweet orange, pummelo, and satsuma mandarin; vegetables, for example spinach, lettuce, asparagus, cabbages, carrots, onions, tomatoes, potatoes, and paprika; coffee; as well as ornamentals, including flowers, such as roses, shrubs, broad-leaved trees and evergreens, for example conifers.

The composition and method of the present invention are particularly advantageous when applied to leguminous plants, sugarcanes, fibre plants, cereals, soybean, corn, cotton and coffee.

The composition of the present invention is advantageous for controlling nematodes and other plant pests and pathogens, including such pests as *Pratylenchus zeae, Meloidogyne javanica, Pratylenchus brachyurus, Meloidogyne exigua, Meloidogyne incognita, Heterodera glycines, Rotylenchulus reniformis*, in crops, such as sugarcane, soybean, cotton, corn and coffee.

The compositions of the present invention may comprise one or more auxiliaries, as known in the art of formulating agrochemical products. The auxiliaries employed in the composition will depend upon the type of formulation and/or the manner in which the formulation is to be applied by the end user. Formulations incorporating the composition of the present invention are described hereinafter. Suitable auxiliaries which may be comprised in the composition according to the invention are all customary formulation adjuvants or components, such as extenders, carriers, solvents, surfactants, stabilizers, anti-foaming agents, anti-freezing agents, preservatives, antioxidants, colorants, thickeners, solid adherents and inert fillers. Such auxiliaries are known in the art and are commercially available. Their use in the formulation of the compositions of the present invention will be apparent to the person skilled in the art.

The composition of the present invention may further comprise one or more inert fillers. Such inert fillers are known in the art and available commercially. Suitable fillers in a form of a solid include, for example, natural ground minerals, such as kaolins, aluminas, talc, chalk, quartz, attapulgite, montmorillonite, and diatomaceous earth, or synthetic ground minerals, such as highly dispersed silicic acid, aluminium oxide, silicates, and calcium phosphates and calcium hydrogen phosphates. Suitable inert fillers for granules include, for example, crushed and fractionated natural minerals, such as calcite, marble, pumice, sepiolite, and dolomite, or synthetic granules of inorganic and organic ground materials, as well as granules of organic material, such as sawdust, coconut husks, corn cobs, and tobacco stalks.

The composition of the present invention optionally includes one or more surfactants, which are preferably non-ionic, cationic and/or anionic in nature and surfactant mixtures which have good emulsifying, dispersing and wetting properties, depending on the nature of the active compound to be formulated. Suitable surfactants are known in the art and are commercially available. Suitable anionic surfactants can be both so-called water-soluble soaps and water-soluble synthetic surface-active compounds. Soaps which may be used are the alkali metal, alkaline earth metal or substituted or unsubstituted ammonium salts of higher fatty acid ($C_{10}$ to $C_{22}$), for example the sodium or potassium salt of oleic or stearic acid, or of natural fatty acid mixtures. The surfactant can be an emulsifier, dispersant or wetting agent of ionic or nonionic type. Examples which may be used are salts of polyacrylic acids, salts of lignosulphonic acid, salts of phenylsulphonic or naphthalenesulphonic acids, polycondensates of ethylene oxide with fatty alcohols or with fatty acids or with fatty amines, substituted phenols, especially alkylphenols, sulphosuccinic ester salts, taurine derivatives, especially alkyltaurates, or phosphoric esters of polyethoxylated phenols or alcohols. The presence of at least one surfactant is generally required when the active compound and/or an inert carrier and/or auxiliary/adjuvant are insoluble in water and the vehicle for the final application of the composition is water.

The composition of the present invention optionally further comprises one or more polymeric stabilizers. Suitable polymeric stabilizers that may be used in the present invention include, but are not limited to, polypropylene, polyisobutylene, polyisoprene, copolymers of monoolefins and diolefins, polyacrylates, polystyrene, polyvinyl acetate, polyurethanes or polyamides. Suitable stabilizers are known in the art and are commercially available.

The surfactants and polymeric stabilizers mentioned above are generally believed to impart stability to the composition, in turn allowing the composition to be formulated, stored, transported and applied.

Suitable anti-foam agents that may be used in the composition of the present invention include all substances which can normally be used for this purpose in agrochemical compositions. Suitable anti-foam agents are known in the art and are available commercially. Particularly preferred anti-foam agents are mixtures of polydimethylsiloxanes and perfluoroalkylphosphonic acids, such as the silicone anti-foam agents available from GE or Compton.

Suitable organic solvents that may be used can be selected from all customary organic solvents which thoroughly dissolve the active compounds employed. Again, suitable organic solvents for the components (A) and (B) are known in the art. The following may be mentioned as being preferred: N-methyl pyrrolidone, N-octyl pyrrolidone, cyclohexyl-1-pyrrolidone; or a mixture of paraffinic, isoparaffinic, cycloparaffinic and aromatic hydrocarbons, sold commercially as SOLVESSO™200. Suitable solvents are commercially available.

Suitable preservatives include all substances which can normally be used for this purpose in agrochemical compositions of this type and again are well known in the art. Suitable examples that may be mentioned include PREVENTOL® (from Bayer AG) and PROXEL® (from Bayer AG).

Suitable antioxidants that may be employed are all substances which can normally be used for this purpose in agrochemical compositions, as is known in the art. Preference is given to butylated hydroxytoluene.

Suitable thickeners include all substances which can normally be used for this purpose in agrochemical compositions, for example xanthan gum, PVOH, cellulose and its derivatives, clay hydrated silicates, magnesium aluminum silicates or a mixture thereof. Again, such thickeners are known in the art and available commercially.

The composition may further comprise one or more solid adherents. Such adherents are known in the art and available commercially. They include organic adhesives, including tackifiers, such as celluloses of substituted celluloses, natural and synthetic polymers in the form of powders, granules, or lattices, and inorganic adhesives such as gypsum, silica or cement.

In addition, depending upon the formulation, the composition according to the present invention may also comprise water.

In some embodiments of the present invention, the composition may be applied and used in pure form, or more preferably together with at least one of the auxiliaries, as described hereinabove.

The composition of the present invention may be formulated in different ways, depending upon the circumstances of its use. Suitable formulation techniques are known in the art and include a water-soluble concentrate (SL), an emulsifiable concentrate (EC), an emulsion (EW), a micro-emulsion (ME), an oil-based suspension concentrate (OD), a flowable suspension (FS), a water-dispersible granule (WG), a water-soluble granule (SG), a water-dispersible powder (WP), a water soluble powder (SP), a granule (GR), an encapsulated granule (CG), a fine granule (FG), a macrogranule (GG), an aqueous suspo-emulsion (SE), a microencapsulated suspension (CS), a microgranule (MG), and a suspension concentrate (SC). Suspension concentrates (SC) and water-dispersible granules (WG) are preferred.

The components (A) and (B) may be applied in any suitable form, as described above. Typically, the components will be applied as formulations, that is compositions comprising one or more of the active components together with further carriers, surfactants or other application-promoting adjuvants customarily employed in formulation technology.

The composition of the present invention may also comprise other active ingredients for achieving specific effects, for example, bactericides, fungicides, insecticides, nematicides, molluscicides or herbicides. Suitable compounds for providing the aforementioned activities are known in the art and are commercially available. The other active ingredients and composition of the present invention may be applied separately, for example simultaneously or consecutively, or together in a single application.

In the method of the present invention, the insecticide component (A) and the fertilizer component (B) may be applied to the target plant or plant of interest, to one or more plant parts, or to the surroundings thereof.

In one embodiment, the present invention provides a composition comprising the following components:
  (A) thiodicarb and (B) fertilizer;
  (A) abamectin and (B) fertilizer;
  (A) thiodicarb and abamectin, and (B) fertilizer;
  (A) thiodicarb and imidacloprid; and (B) fertilizer; or
  (A) thiodicarb and fipronil; and (B) fertilizer The composition of this embodiment is particularly effective for controlling and combating *Pratylenchus zeae, Meloidogyne javanica, Pratylenchus brachyurus, Meloidogyne exigua, Meloidogyne incognita, Heterodera glycines, Rotylenchulus reniformis* in plants, plant parts and/or their surroundings. The composition is also effective in improving the growth of plants or parts thereof.

In another embodiment, the present invention provides a method of controlling *Pratylenchus zeae* and *Meloidogyne javanica* at a locus comprising applying to the locus a composition comprising the following components:
  (A) thiodicarb and (B) fertilizer;
  (A) abamectin and (B) fertilizer;
  (A) thiodicarb and abamectin, and (B) fertilizer;
  (A) thiodicarb and imidacloprid; and (B) fertilizer; or
  (A) thiodicarb and fipronil; and (B) fertilizer.

The method is also effective in promoting the growth of plants or parts thereof.

As noted above, it is preferred to employ an oxime carbamate insecticide in the present invention, either alone or in combination with another insecticide. As also noted, thiodicarb is a particularly preferred oxime carbamate. It has been found that an oxime carbamate, in particular thiodicarb, when used in combination with a fertilizer component, as described above, is particularly effective in controlling nematodes and also in promoting plant growth. In some embodiments, the plant growth is increased/improved by at least about 5%. In other embodiments, the plant growth is increased/improved by at least about 10%. In some embodiments, the plant growth is increased/improved by at least about 20%. In certain embodiments, the plant growth is increased/improved by at least about 50%.

In general, the components (A) and (B) may be prepared and applied at any suitable rate, as demanded by the locus to be treated. The application rate may vary within wide ranges and depends upon such factors as the soil constitution, the type of application (foliar application; seed dressing; application in the seed furrow), the target crop plant, the nematodes to be controlled, the climatic circumstances prevailing in each case, and other factors determined by the type of application, timing of application and target crop.

In general, the application rate for the insecticidal component (A) for spray applications is from about 1 to about 4000 gram per hectare (g/ha), preferably from 1 to 3000 g/ha, more preferably from 1 to 2500 g/ha.

In embodiments in which the insecticidal component (A) comprises an oxime carbamate, such as thiodicarb, the application rate for the oxime carbamate is preferably from about 1 to about 3000 g/ha, more preferably from 100 to 3000 g/ha, still more preferably from 200 to 2500 g/ha.

In embodiments in which the insecticidal component (A) comprises an avermectin, such as abamectin, the application rate for the avermectin is preferably from 1 to about 800 g/ha, in particular from 1 to 500 g/ha, more preferably from 1 to 250 g/ha.

In embodiments in which the insecticidal component (A) comprises a neonicotinoid, such as imidacloprid, the application rate for the neonicotinoid is preferably from 1 to about 800 g/ha, in particular from 5 to 500 g/ha, more preferably from 5 to 400 g/ha.

In embodiments in which the insecticidal component (A) comprises a phenylpyrazole compound, such as fipronil, the application rate for the phenylpyrazole compound is preferably from 1 to about 500 g/ha, in particular from 1 to 300 g/ha, more preferably from 1 to 250 g/ha.

In general, the application rate for the insecticidal component (A) for seed treatment applications is from about 1 to about 5000 gram per 100 kg of seeds, preferably from 1 to 4000 g per 100 kg of seeds, more preferably from 1 to 3000 g per 100 kg of seeds.

In embodiments in which the insecticidal component (A) comprises an oxime carbamate, such as thiodicarb, the application rate for the oxime carbamate is preferably from about 1 to about 3000 g per 100 kg of seeds, in particular from 100 to 3000 g per 100 kg of seeds, more preferably from 200 to 2500 g per 100 kg of seeds, still more preferably from 200 to 1000 g per 100 kg of seeds.

In embodiments in which the insecticidal component (A) comprises an avermectin, such as abamectin, the application rate for the avermectin is preferably from 1 to about 800 g per 100 kg of seeds, in particular from 1 to 500 g per 100 kg of seeds, more preferably from 1 to 250 g per 100 kg of seeds, still more preferably from 1 to 200 g per 100 kg of seeds.

In embodiments in which the insecticidal component (A) comprises a neonicotinoid, such as imidacloprid, the application rate for the neonicotinoid is preferably from 1 to about 800 g per 100 kg of seeds, in particular from 5 to 500 g per 100 kg of seeds, more preferably from 5 to 400 g per 100 kg of seeds, still more preferably from 5 to 200 g per 100 kg of seeds.

In embodiments in which the insecticidal component (A) comprises a phenylpyrazole compound, such as fipronil, the application rate for the phenylpyrazole compound is preferably from 1 to about 500 g per 100 kg of seeds, in particular from 1 to 300 g per 100 kg of seeds, more preferably from 1 to 250 g per 100 kg of seeds, still more preferably from 1 to 200 g per 100 kg of seeds.

The application rate of the micronutrient will similarly vary according to the components being used and the factors indicated above.

For example, when applying the fertilizer component (B) by way of a spray, the application rates of the spray are preferably 0.1 to 10 litres per hectare (L/ha), more preferably from 0.5 to 5 L/ha. In general, the application rate of the fertilizer component (B) is from 5 to 5000 gram per hectare (g/ha), preferably from 5 to 4000 g/ha, more preferably from 10 to 3000 g/ha, still more preferably from 10 to 2000 g/ha.

In the spray treatment, amino acids may be applied at an application rate of from 5 gram per hectare (g/ha) to 2000 g/ha, more preferably from 10 g/ha to 1000 g/ha, still more preferably from 10 to 600 g/ha. Similarly, micronutrients may be applied at an application rate of from 1 g/ha to 2000 g/ha, more preferably from 2 g/ha to 1000 g/ha, still more preferably from 2 g/ha to 600 g/ha.

When applying the fertilizer component (B) as a seed treatment, the application rate may be from 10 mL to 1000 mL per 100 kg of seeds. In general, the application rate of the fertilizer component (B) to the seeds is from 1 to 400 g per 100 kg of seeds, preferably from 1 to 300 g per 100 kg of seeds, more preferably still from 1 to 250 g per 100 kg of seeds.

In the seed treatment, amino acids may be applied at a rate of from 0.5 to 200 g per 100 kg of seeds, more preferably from 1 to 100 g per 100 kg of seeds, still more preferably from 1 to 80 g per 100 kg of seeds. Similarly, micronutrients may be applied at an application rate of from 0.1 to 200 g per 100 kg of seeds, more preferably from 0.2 to 100 g per 100 kg of seeds, still more preferably from 0.2 to 80 g per 100 kg of seeds.

The insecticide component (A) and the fertilizer component (B) may be applied together, that is simultaneously, to the plants, plant material or locus to be treated, or separately. If applied separately the components may be applied simultaneously or concurrently. In embodiments in which one or both of components (A) and (B) comprise a plurality of components, two or more of the individual components may be applied together and/or one or more of the individual components may be applied separately. If applied separately the components may be applied simultaneously or concurrently.

In the event, components (A) and (B) are applied simultaneously in the present invention, they may be applied as a single composition containing components (A) and (B), in which components (A) and (B) can be obtained from a separate formulation source and mixed together (known as a tank-mix, ready-to-apply, spray broth, or slurry), optionally with other pesticides, or components (A) and (B) can be obtained as a single formulation mixture source (known as a pre-mix, concentrate, formulated compound (or product), for example the composition as described hereinbefore, and optionally mixed together with other pesticides.

According to the present invention, the components (A) and (B) may be applied in any suitable form, for example as described above, and applied to the locus where control is desired either simultaneously or in succession at short intervals, for example on the same day. Preferably, the nematicidal composition is applied a plurality of times, in particular from 2 to 5 times, more preferably 3 times.

According to the present invention, the components (A) and (B) may be applied at any suitable time. In some embodiments of the present invention, the components are applied to the surrounding of the plant prior to planting, during planting, or after planting. Such a treatment may take place by conventional methods known in the art, for instance, drip-irrigation, spray, and soil fumigation. The components (A) and (B) may be applied directly to the plants or plant parts. Again, techniques for this treatment are known in the art. In some embodiments, the components are applied to the plant propagation material, such as a seed, by seed coating. These application methods and corresponding application machines are known in the art.

Embodiments of the present invention are now described, for illustrative purposes only, by way of the following examples. Where not otherwise specified throughout this specification and claims, percentages are by weight.

TEST EXAMPLES

Example 1—Sugarcane—*Pratylenchus zeae*

A nematode inoculum was prepared from a pure subpopulation of *Pratylenchus zeae* recovered from sugarcane crops located in Pacaembú-State of São Paulo-Brazil. The subpopulation was multiplied from corn plants (*Zea mays* L.) 'DKB 390 PRO' in clay recipients in a greenhouse. The subpopulation was previously identified based on morphological characters of adult females mounted in temporary slides by using a dicotomic key created by SANTOS et al. (2005).

3 mL samples of the compositions summarized in Table 1 below were applied uniformly on the soil and around the roots at the indicated rates. Thereafter, the roots of the sugarcane were inoculated with 10 mL of a suspension containing *Pratylenchus zeae* in various stages of development, after which the roots were covered with soil. 5 replicates were carried out.

TABLE 1

| Samples | Content (gram of thiodicarb per ha) | Content (gram of abamectin per ha) | Content of fertilizer |
|---|---|---|---|
| 1. Thiodicarb 350 SC (6.0 L/ha) | 2100 | 0 | 0 |
| 2. Abamectin 150 SC (1.0 L/ha) | 0 | 150 | 0 |
| 3. Fertilizer (2.0 L/ha) | 0 | 0 | See Note* |
| 4. Thiodicarb 350 SC (6.0 L/ha) + Abamectin 150 SC (1.0 L/ha) | 2100 | 150 | 0 |
| 5. Thiodicarb 350 SC (6.0 L/ha) + Fertilizer (2.0 L/ha) | 2100 | 0 | See Note* |
| 6. Abamectin 150 SC (1.0 L/ha) + Fertilizer (2.0 L/ha) | 0 | 150 | See Note* |
| 7. Thiodicarb 350 SC (6.0 L/ha) + Abamectin 150 SC (1.0 L/ha) + Fertilizer (2.0 L/ha) | 2100 | 150 | See Note* |
| 8. Control | 0 | 0 | 0 |

Note*:

Fertizer composition:- 12% amino acids; 10% micronutrients (zinc sulphate, sodium borate complex, iron sulphate, manganese sulphate and copper sulphate); 10% auxiliaries (including solvent, surfactant and stabilizer) in water After 15 and 30 days, the phytotoxic effects of the treatment were evaluated. No symptoms of phytotoxicity in the sugarcane plants were observed.

Fresh matter of the shoots and roots of the sugarcane plants was measured 90 days after application. The results are summarized in Table 2 below.

TABLE 2

| Samples | Fresh Matter of Shoot (g) Day 90 (Days after application) | Fresh Matter of Roots (g) |
|---|---|---|
| 1. Thiodicarb 350 SC (6.0 L/ha) | 120.00 | 62.00 |
| 2. Abamectin 150 SC (1.0 L/ha) | 144.00 | 58.40 |
| 3. Fertilizer (2.0 L/ha) | 90.60 | 37.40 |
| 4. Thiodicarb 350 SC (6.0 L/ha) + Abamectin 150 SC (1.0 L/ha) | 138.20 | 53.00 |
| 5. Thiodicarb 350 SC (6.0 L/ha) + Fertilizer (2.0 L/ha) | 212.50 | 81.10 |
| 6. Abamectin 150 SC (1.0 L/ha) + Fertilizer (2.0 L/ha) | 207.20 | 82.80 |
| 7. Thiodicarb 350 SC (6.0 L/ha) + Abamectin 150 SC (1.0 L/ha) + Fertilizer (2.0 L/ha) | 223.20 | 83.20 |
| 8. Control | 59.60 | 48.20 |

As can be seen from the results set out in Table 2, the combination of an insecticide component (A) and a fertilizer component (B) resulted in significantly increased plant growth, compared with either component (A) or component (B) applied alone and the Control.

The number of *Pratylenchus zeae* in various development stages in the roots and in 10 grams of root material were counted 135 days after application. The results are set out in Table 3 below.

TABLE 3

| Samples | Number of *Pratylenchus zeae* in various development stages in roots Day 135 (Days after application) | Number of *Pratylenchus zeae* in various development stages in 10 grams of roots |
|---|---|---|
| 1. Thiodicarb 350 SC (6.0 L/ha) | 12688.00 | 1397.90 |
| 2. Abamectin 150 SC (1.0 L/ha) | 28320.00 | 1796.30 |
| 3. Fertilizer (2.0 L/ha) | 13672.00 | 850.00 |
| 4. Thiodicarb 350 SC (6.0 L/ha) + Abamectin 150 SC (1.0 L/ha) | 11464.00 | 975.10 |
| 5. Thiodicarb 350 SC (6.0 L/ha) + Fertilizer (2.0 L/ha) | 3578.00 | 198.10 |
| 6. Abamectin 150 SC (1.0 L/ha) + Fertilizer (2.0 L/ha) | 3704.00 | 210.20 |
| 7. Thiodicarb 350 SC (6.0 L/ha) + Abamectin 150 SC (1.0 L/ha) + Fertilizer (2.0 L/ha) | 3812.00 | 217.80 |
| 8. Control | 15904.00 | 1548.40 |

As can be seen from the results set out in Table 3, the combination of an insecticide component (A) and a fertilizer component (B) provided significantly increased control of the nematodes, compared with either component (A) or component (B) applied alone and the Control. The results indicate a synergy between the insecticide component (A) and the fertilizer component (B).

Example 2—Sugarcane—*Pratylenchus zeae*

A nematode inoculum was prepared from a pure subpopulation of *Pratylenchus zeae* recovered from sugarcane crops located in Pacaembú-State of São Paulo-Brazil. The subpopulation was multiplied from corn plants (*Zea mays* L.) "DKB 390 PRO" in clay recipients in a greenhouse. The subpopulation was previously identified based on morphological characters of adult females mounted in temporary slides by using a dicotomic key created by SANTOS et al. (2005).

3 mL samples of the compositions summarized in Table 4 below were applied uniformly on the soil and around the roots at the indicated rates. Thereafter, the roots of the sugarcane were inoculated with 10 mL of a suspension containing *Pratylenchus zeae* in various stages of development, after which the roots were covered with soil. 5 replicates were carried out.

TABLE 4

| Samples | Content (gram of thiodicarb per ha) | Content (gram of abamectin per ha) | Content of fertilizer |
|---|---|---|---|
| 1. Thiodicarb (6 L/ha) + Abamectin (1 L/ha) + Fertilizer (2 L/ha) | 2100 | 150 | See Note* |
| 2. Control | 0 | 0 | 0 |

Note*:
Fertilizer composition:- 12% amino acids; 10% micronutrients (zinc sulphate and sodium borate); 10% auxiliaries (including solvent, surfactant and stabilizer) in water.

The number of *Pratylenchus zeae* in various development stages in 10 grams of root material were counted 135 days after application. The results are set out in Table 5 below.

TABLE 5

| Samples | Number of eggs of nematodes in 10 g of roots Day 135 (Days after application) |
|---|---|
| 1. Thiodicarb 350 SC (6.0 L/ha) + Abamectin 150 SC (1.0 L/ha) + Fertilizer (2.0 L/ha) | 0.00 |
| 2. Control | 83.60 |

As can be seen from the results in Table 5, the present invention provided complete control over the nematode population.

Example 3—Sugarcane—*Meloidogyne javanica* and *Pratylenchus zeae*

A nematode inoculum was prepared from a pure subpopulation of *Meloidogyne javanica* kept in soybean plants (*Glycine max* L.) in clay recipients in a greenhouse. The subpopulation was previously identified based on morphological characters of perineal patterns prepared as per TAYLOR & NETSCHER (1974), on the morphology of the mouth region of males (EISENBACK et al., 1981), and on the isoenzymatic phenotype for esterasis obtained from the technique by ESBENSHADE & TRIANTAPHYLLOU (1990), using a traditional vertical electropheresis system, namely Mini Protean II by BIO-RAD.

3 mL samples of the compositions summarized in Table 6 below were applied uniformly on the soil and around the roots at the indicated rate. Thereafter, the roots of the sugarcane plants were inoculated with 10 mL of a suspension containing 5000 eggs (*Pratylenchus zeae* and *Meloidogyne javanica*) and second-stage juveniles of *Meloidogyne javanica*, after which the roots were covered with soil. 5 replicates were carried out. Analysis showed *Meloidogyne javanica* and *Pratylenchus zeae* to be present in a suspension of extracted roots.

TABLE 6

| Samples | Content (gram of thiodicarb per ha) | Content (gram of abamectin per ha) | Content of fertilizer |
|---|---|---|---|
| 1. Thiodicarb 350 SC (6.0 L/ha) | 2100 | 0 | 0 |
| 2. Abamectin 150 SC (1.0 L/ha) | 0 | 150 | 0 |
| 3. Fertilizer (2.0 L/ha) | 0 | 0 | See Note* |
| 4. Thiodicarb 350 SC (6.0 L/ha) + Abamectin 150 SC (1.0 L/ha) | 2100 | 150 | 0 |
| 5. Thiodicarb 350 SC (6.0 L/ha) + Fertilizer (2.0 L/ha) | 2100 | 0 | See Note* |
| 6. Abamectin 150 SC (1.0 L/ha) + Fertilizer (2.0 L/ha) | 0 | 150 | See Note* |
| 7. Thiodicarb 350 SC (6.0 L/ha) + Abamectin 150 SC (1.0 L/ha) + Fertilizer (2.0 L/ha) | 2100 | 150 | See Note* |
| 5. Control | 0 | 0 | 0 |

Note*:
Fertilizer composition:- 12% amino acids; 10% micronutrients (zinc sulphate, sodium borate complex, iron sulphate, manganese sulphate and copper sulphate); 10% auxiliaries (including solvent, surfactant and stabilizer) in water.
After 15 and 30 days, the phytotoxic effects of the treatment were evaluated. No symptoms of phytotoxicity in the sugarcane plants were observed.

The number of *Meloidogyne javanica* in various developmental stages in the roots of the plants was counted 150 days after application. The results are set out in Table 7 below.

TABLE 7

| Samples | Number of *Meloidogyne javanica* in various development stages in roots Day 150 (Days after application) |
|---|---|
| 1. Thiodicarb 350 SC (6.0 L/ha) | 280.00 |
| 2. Abamectin 150 SC (1.0 L/ha) | 145.00 |
| 3. Fertilizer (2.0 L/ha) | 82.00 |
| 4. Thiodicarb 350 SC (6.0 L/ha) + Abamectin 150 SC (1.0 L/ha) | 161.00 |
| 5. Thiodicarb 350 SC (6.0 L/ha) + Fertilizer (2.0 L/ha) | 29.00 |
| 6. Abamectin 150 SC (1.0 L/ha) + Fertilizer (2.0 L/ha) | 30.40 |
| 7. Thiodicarb 350 SC (6.0 L/ha) + Abamectin 150 SC (1.0 L/ha) + Fertilizer (2.0 L/ha) | 26.98 |
| 8. Control | 416.00 |

As can be seen in the results set out in Table 7, the combination of an insecticide component (A) and a fertilizer component (B) provided significantly increased control of the nematodes, compared with either component (A) or component (B) applied alone and the Control. The results indicate a synergy between the insecticide component (A) and the fertilizer component (B).

Example 4—Sugarcane—*Meloidogyne javanica* and *Pratylenchus zeae*

A nematode inoculum was prepared from a pure subpopulation of *Meloidogyne javanica* kept in soybean plants (*Glycine max* L.) in clay recipients in a greenhouse. The subpopulation was previously identified based on morphological characters of perineal patterns prepared as per TAYLOR & NETSCHER (1974), on the morphology of the mouth region of males (EISENBACK et al., 1981), and on the isoenzymatic phenotype for esterasis obtained from the technique by ESBENSHADE & TRIANTAPHYLLOU (1990), using a traditional vertical electropheresis system, namely Mini Protean II by BIO-RAD.

3 mL samples of the compositions summarized in Table 8 below were applied uniformly on the soil and around the roots at the indicated. Thereafter, the roots of the sugarcane plants were inoculated with 10 mL of a suspension containing 5000 eggs (*Pratylenchus zeae* and *Meloidogyne javanica*) and second-stage juveniles of *Meloidogyne javanica*, after which the roots were covered with soil. 5 replicates were carried out. Analysis showed *Meloidogyne javanica* and *Pratylenchus zeae* to be present in a suspension of extracted roots.

TABLE 8

| Samples | Content (gram of thiodicarb per ha) | Content (gram of abamectin per ha) | Content of fertilizer |
|---|---|---|---|
| 1. Fertilizer (2.0 L/ha) | 0 | 0 | See Note* |
| 2. Thiodicarb 350 SC (6.0 L/ha) + Abamectin 150 SC (1.0 L/ha) | 2100 | 150 | 0 |
| 3. Thiodicarb 350 SC (6.0 L/ha) + Fertilizer (2.0 L/ha) | 2100 | 0 | See Note* |

TABLE 8-continued

| Samples | Content (gram of thiodicarb per ha) | Content (gram of abamectin per ha) | Content of fertilizer |
|---|---|---|---|
| 4. Abamectin 150 SC (1.0 L/ha) + Fertilizer (2.0 L/ha) | 0 | 150 | See Note* |
| 5. Thiodicarb 350 SC (6.0 L/ha) + Abamectin 150 SC (1.0 L/ha) + Fertilizer (2.0 L/ha) | 2100 | 150 | See Note* |
| 6. Control | 0 | 0 | 0 |

Note*:
Fertilizer composition:- 12% amino acids; 10% micronutrients (zinc sulphate, sodium borate complex, iron sulphate, manganese sulphate and copper sulphate); 10% auxiliaries (including solvent, surfactant and stabilizer) in water.

The number of *Pratylenchus zeae* in various developmental stages in the roots of the plants and the number of *Pratylenchus zeae* in various developmental stages in 10 gram of root material were counted 100 days after application. The results are set out in Table 9 below.

TABLE 9

| Samples | Number of *Pratylenchus zeae* in various development stages in roots — Day 100 (Days after application) | Number of *Pratylenchus zeae* in various development stages in 10 gram of roots |
|---|---|---|
| 1. Fertilizer (2.0 L/ha) | 700.80 | 148.67 |
| 2. Thiodicarb 350 SC (6.0 L/ha) + Abamectin 150 SC (1.0 L/ha) | 313.6 | 37.36 |
| 3. Thiodicarb 350 SC (6.0 L/ha) + Fertilizer (2.0 L/ha) | 79.00 | 10.30 |
| 4. Abamectin 150 SC (1.0 L/ha) + Fertilizer (2.0 L/ha) | 86.00 | 11.40 |
| 5. Thiodicarb 350 SC (6.0 L/ha) + Abamectin 150 SC (1.0 L/ha) + Fertilizer (2.0 L/ha) | 72.00 | 9.70 |
| 6. Control | 1120.00 | 100.42 |

As can be seen in the results set out in Table 9, the combination of an insecticide component (A) and a fertilizer component (B) provided significantly increased control of the nematodes, compared with either component (A) or component (B) applied alone and the Control. The results indicate a synergy between the insecticide component (A) and the fertilizer component (B).

Example 5—Sugarcane—*Meloidogyne javanica* and *Pratylenchus zeae*

A nematode inoculum was prepared from a pure subpopulation of *Meloidogyne javanica* kept in soybean plants (*Glycine max* L.) in clay recipients in a greenhouse. The subpopulation was previously identified based on morphological characters of perineal patterns prepared as per TAYLOR & NETSCHER (1974), on the morphology of the mouth region of males (EISENBACK et al., 1981), and on the isoenzymatic phenotype for esterasis obtained from the technique by ESBENSHADE & TRIANTAPHYLLOU (1990), using a traditional vertical electropheresis system, namely Mini Protean II by BIO-RAD.

3 mL samples of the compositions summarized in Table 8 below were applied uniformly on the soil and around the roots at the indicated rate. Thereafter, the roots of the sugarcane plants were inoculated with 10 mL of a suspension containing 5000 eggs (*Pratylenchus zeae* and *Meloidogyne javanica*) and second-stage juveniles of *Meloidogyne javanica*, after which the roots were covered with soil. 5 replicates were carried out. Analysis showed *Meloidogyne javanica* and *Pratylenchus zeae* to be present in a suspension of extracted roots.

TABLE 10

| Samples | Content (gram of thiodicarb per ha) | Content (gram of abamectin per ha) | Content of fertilizer |
|---|---|---|---|
| 1. Thiodicarb 350 SC (6.0 L/ha) + Abamectin 150 SC (1.0 L/ha) + Fertilizer (2.0 L/ha) | 2100 | 150 | See Note* |
| 2. Thiodicarb 350 SC (6.0 L/ha) + Abamectin 150 SC (1.0 L/ha) | 2100 | 150 | 0 |
| 3. Control | 0 | 0 | 0 |

Note*:
Fertilizer composition:- 12% amino acids; 10% micronutrients (zinc sulphate, sodium borate complex, iron sulphate, manganese sulphate and copper sulphate); 10% auxiliaries (including solvent, surfactant and stabilizer) in water.

The number of nematode eggs in the plant roots and the number of nematode eggs in 10 gram of root material were counted 100 days after application. The results are set out in Table 11.

TABLE 11

| Samples | Number of eggs of nematodes in roots — Day 100 (Days after application) | Number of eggs of nematodes in 10 gram of roots |
|---|---|---|
| 1. Thiodicarb 350 SC (6.0 L/ha) + Abamectin 150 SC (1.0 L/ha) + Fertilizer (2.0 L/ha) | 0.00 | 0.00 |
| 2. Thiodicarb 350 SC (6.0 L/ha) + Abamectin 150 SC (1.0 L/ha) | 1403 | 153.60 |
| 3. Control | 12160.00 | 755.90 |

As can be seen in the results set out in Table 11, the combination of an insecticide component (A) and a fertilizer component (B) provided significantly increased control of the nematodes, compared with component (A) applied alone and the Control.

Example 6—Soybean—*Meloidogyne javanica*

A nematode inoculum was prepared from a pure subpopulation of *Meloidogyne javanica* kept in tomato plants (*Solanum lycopersicom* L.) in clay recipients in a greenhouse. The subpopulation was previously identified based on morphological characters of perineal patterns prepared as per TAYLOR & NETSCHER (1974), on the morphology of the mouth region of males (EISENBACK et al., 1981), and on the isoenzymatic phenotype for esterasis obtained from the technique by ESBENSHADE & TRIANTAPHYLLOU (1990), using a traditional vertical electropheresis system, namely Mini Protean II by BIO-RAD.

A suspension containing eggs and second stage juveniles (J2) was prepared from the tomato roots. 10 mL of the suspension was inoculated with eggplant and allowed to stand for 22 days. Thereafter, the eggplant was transplanted to pots and kept in the greenhouse. After 100 days, the roots of the eggplant were washed and ground in a blender with a solution of 0.5% sodium hypochlorite. The suspension was then passed through a sieve of 200 mesh (0.074 mm openings) on 500 (0.025 mm openings). The eggs and juveniles retained on the 500 mesh sieve were collected and washed.

Soybean seeds were treated with the compositions indicated in Table 12 below. The seeds were then inoculated with 3 mL of a suspension containing 5,000 eggs and second stage juveniles of *Meloidogyne javanica* recovered as described above.

TABLE 12

| Samples | Content (gram of thiodicarb per 100 kg of seed) | Content (gram of fipronil per 100 kg of seed) | Content of fertilizer (mL per 100 kg of seed) |
|---|---|---|---|
| 1. Fertilizer (200 mL per 100 kg of seed) | 0 | 0 | 200 mL (See Note*) |
| 2. Thiodicarb 350 SC + Fipronil 250 SC (50 g per 100 kg of seed) + Fertilizer (200 mL per 100 kg of seed) | 227.5 | 50 | 200 mL (See Note*) |
| 3. Control | 0 | 0 | 0 |

Note*:
Fertilizer composition:- 12% amino acids; 10% of micronutrients (zinc sulphate, sodium borate complex); 10% auxiliaries (including solvent, surfactant and stabilizer) in water.
19 days after sowing, the phytotoxic effects of the treatment were evaluated. No symptoms of phytotoxicity in the soybean plants were observed.

Shoot height was measured 52 days after sowing. The results are set out in Table 13 below.

TABLE 13

| Samples | Shoot Height (cm) Day 52 (Days after sowing) |
|---|---|
| 1. Fertilizer (200 mL per 100 kg of seed) | 69.5 |
| 2. Thiodicarb 350 SC + Fipronil 250 SC (50 g per 100 kg of seed) + Fertilizer (200 mL per 100 kg of seed) | 75.5 |
| 3. Control | 72.0 |

As can be seen from Table 13, a combination of an insecticide component (A) and a fertilizer component (B) was effective in achieving significantly improved plant growth, compared with fertilizer alone and the control.

Example 7—Soybean—*Meloidogyne javanica*

A nematode inoculum was prepared from a pure subpopulation of *Meloidogyne javanica* kept in tomato plants (*Solanum lycopersicom* L.) in clay recipients in a greenhouse. The subpopulation was previously identified based on morphological characters of perineal patterns prepared as per TAYLOR & NETSCHER (1974), on the morphology of the mouth region of males (EISENBACK et al., 1981), and on the isoenzymatic phenotype for esterasis obtained from the technique by ESBENSHADE & TRIANTAPHYLLOU (1990), using a traditional vertical electropheresis system, namely Mini Protean II by BIO-RAD.

A suspension containing eggs and second stage juveniles (J2) was prepared from the tomato roots. 10 mL of the suspension was inoculated with eggplant and allowed to stand for 22 days. Thereafter, the eggplant was transplanted to pots and kept in the greenhouse. After 100 days, the roots of the eggplant were washed and ground in a blender with a solution of 0.5% sodium hypochlorite. The suspension was then passed through a sieve of 200 mesh (0.074 mm openings) on 500 (0.025 mm openings). The eggs and juveniles retained on the 500 mesh sieve were collected and washed.

Soybean seeds were treated with the compositions indicated in Table 14 below. The seeds were then inoculated with 3 mL of a suspension containing 5,000 eggs and second stage juveniles of *Meloidogyne javanica* recovered as described above.

TABLE 14

| Samples | Content (gram of thiodicarb per 100 kg of seed) | Content (gram of fipronil per 100 kg of seed) | Content of fertilizer (mL per 100 kg of seed) |
|---|---|---|---|
| 1. Fertilizer (200 mL) | 0 | 0 | 200 mL (See Note*) |
| 2. Thiodicarb 350 SC (650 mL) + Imidacloprid 600 FS (75 mL) | 227.5 | 45 | 0 |
| 3. Thiodicarb 350 SC (900 mL) + Imidacloprid 600 FS (75 mL) + Fertilizer (200 mL) | 315 | 45 | 200 mL (See Note*) |
| 4. Thiodicarb 350 SC (650 mL) + Imidacloprid 600 FS (75 mL) + Fertilizer (200 mL) | 227.5 | 50 | 200 mL (See Note*) |
| 5. Control | 0 | 0 | 0 |

Note*:
Fertilizer composition:- 12% amino acids; 10% micronutrients (zinc sulphate, sodium borate complex, iron sulphate, manganese sulphate and copper sulphate); 10% auxiliaries (including solvent, surfactant and stabilizer) in water.
19 days after sowing, the phytotoxic effects of the treatment were evaluated. No symptoms of phytotoxicity in the soybean plants were observed.

The fresh shoot matter present 52 days after sowing and the root length 90 days after sowing were measured. The results are set out in Table 15 below.

TABLE 15

| Samples | Fresh matter of shoot (g) Day 52 (Days after sowing) | Root length (cm) Day 90 (Days after sowing) |
|---|---|---|
| 1. Fertilizer (200 mL) | 76.8 | 19.4 |
| 2. Thiodicarb 350 SC (650 mL) + Imidacloprid 600 FS (75 mL) | 47.4 | 23.9 |
| 3. Thiodicarb 350 SC (900 mL) + Imidacloprid 600 FS (75 mL) + Fertilizer (200 mL) | 88.3 | 27.3 |
| 4. Thiodicarb 350 SC (650 mL) + Imidacloprid 600 FS (75 mL) + Fertilizer (200 mL) | 86.4 | 27.5 |
| 5. Control | 77.4 | 20.7 |

As can be seen from Table 13, a combination of an insecticide component (A) and a fertilizer component (B) was effective in achieving significantly improved plant growth, compared with insecticide alone, fertilizer alone and the control.

Example 8—Soybean—*Meloidogyne javanica*

A nematode inoculum was prepared from a pure subpopulation of *Meloidogyne javanica* kept in tomato plants (*Solanum lycopersicom* L.) in clay recipients in a greenhouse. The subpopulation was previously identified based on morphological characters of perineal patterns prepared as per TAYLOR & NETSCHER (1974), on the morphology of the mouth region of males (EISENBACK et al., 1981), and on the isoenzymatic phenotype for esterasis obtained from the technique by ESBENSHADE & TRIANTAPHYLLOU (1990), using a traditional vertical electrophoresis system, namely Mini Protean II by BIO-RAD.

A suspension containing eggs and second stage juveniles (J2) was prepared from the tomato roots. 10 mL of the suspension was inoculated with eggplant and allowed to stand for 22 days. Thereafter, the eggplant was transplanted to pots and kept in the greenhouse. After 100 days, the roots of the eggplant were washed and ground in a blender with a solution of 0.5% sodium hypochlorite. The suspension was then passed through a sieve of 200 mesh (0.074 mm openings) on 500 (0.025 mm openings). The eggs and juveniles retained on the 500 mesh sieve were collected and washed.

Soybean seeds were treated with the compositions indicated in Table 16 below. The seeds were then inoculated with 3 mL of a suspension containing 5,000 eggs and second stage juveniles of *Meloidogyne javanica* recovered as described above.

TABLE 16

| Samples | Content (gram of thiodicarb per 100 kg of seeds) | Content (gram of Imidacloprid per 100 kg of seeds) | Content (gram of fipronil per 100 kg of seeds) | Content of fertilizer (mL per 100 kg of seeds) |
|---|---|---|---|---|
| 1. Thiodicarb 350 SC (650 mL) + Imidacloprid 600 FS (75 mL) | 227.5 | 45 | 0 | 0 |
| 2. Thiodicarb 350 SC (650 mL) + Imidacloprid 600 FS (75 mL) + fertilizer (200 mL) | 227.5 | 45 | 0 | 200 See Note* |
| 3. Thiodicarb 350 SC (900 mL) + Imidacloprid 600 FS (75 mL) | 227.5 | 45 | 0 | 0 |
| 4. Thiodicarb 350 SC (900 mL) + Imidacloprid 600 FS (75 mL) + fertilizer (200 mL) | 315 | 45 | 0 | 200 See Note* |
| 5. Thiodicarb 350 SC (650 mL) + fipronil 600 FS (200 mL) | 227.5 | 0 | 50 | 0 |
| 6. Thiodicarb 350 SC (650 mL) + fipronil 600 FS (200 mL) + fertilizer (200 mL) | 227.5 | 0 | 50 | 200 See Note* |
| 7. Control | 0 | 0 | 0 | 0 |

Note:
Fertilizer composition:- 12% amino acids; 10% of micronutrients (zinc sulphate, sodium borate complex); 10% auxiliaries (including solvent, surfactant and stabilizer) in water.

The number of galls on the plant roots and the number of galls on 10 g of root material were counted 52 days after application. The results are set out in Table 17 below.

TABLE 17

| Samples | Galls on roots Day 52 (Days after application) | Galls on 10 g of roots |
|---|---|---|
| 1. Thiodicarb 350 SC (650 mL) + Imidacloprid 600 FS (75 mL) | 20.7 | 43.5 |
| 2. Thiodicarb 350 SC (650 mL) + Imidacloprid 600 FS (75 mL) + fertilizer (200 mL) | 10.7 | 24.5 |
| 3. Thiodicarb 350 SC (900 mL) + Imidacloprid 600 FS (75 mL) | 17.8 | 25.4 |
| 4. Thiodicarb 350 SC (900 mL) + Imidacloprid 600 FS (75 mL) + fertilizer (200 mL) | 0.3 | 0.4 |
| 5. Thiodicarb 350 SC (650 mL) + fipronil 600 FS (200 mL) | 11.5 | 34.0 |
| 6. Thiodicarb 350 SC (650 mL) + fipronil 600 FS (200 mL) + fertilizer (200 mL) | 2.8 | 5.3 |
| 7. Control | 16.8 | 33.6 |

As can be seen in the results set out in Table 17, the combination of an insecticide component (A) and a fertilizer component (B) provided significantly increased control of the nematodes.

The number of eggs and second-stage juveniles of *Meloidogyne javanica* in the plant roots and the number of eggs and second-stage juveniles of *Meloidogyne javanica* in 10 g of root of root material were counted 52 days after application. The results are set out in Table 18 below.

TABLE 18

| Samples | Number of eggs and second-stage juveniles of *Meloidogyne javanica* in roots Day 52 (Days after application) | Number of eggs and second-stage juveniles of *Meloidogyne javanica* in 10 g of roots |
|---|---|---|
| 1. Thiodicarb 350 SC (650 mL) + Imidacloprid 600 FS (75 mL) | 2040 | 4444 |
| 2. Thiodicarb 350 SC (650 mL) + Imidacloprid 600 FS (75 mL) + fertilizer (200 mL) | 712 | 2229 |
| 5. Thiodicarb 350 SC (650 mL) + fipronil 600 FS (200 mL) | 1209 | 2005 |
| 6. Thiodicarb 350 SC (650 mL) + fipronil 600 FS (200 mL) + fertilizer (200 mL) | 605 | 984 |
| 7. Control | 2829 | 5475 |

As can be seen from the above table, the formulations prepared according to the present invention exhibited significantly improved efficacy in controlling the target pests than the commercially available compositions.

Example 9—Coffee—*Meloidogyne exigua*

A nematode inoculum was prepared from a pure subpopulation of *Meloidogyne exigua* in tomato plants (*Solanum lycopersicom* L.) in clay recipients in a greenhouse. The subpopulation was previously identified based on morphological characters of perineal patterns, on the morphology of the mouth region, and on the isoenzymatic phenotype for esterasis.

3 mL samples of the compositions summarized in Table 19 below were applied uniformly on the soil and around the roots at the indicated rate. Thereafter, the roots of the young coffee plants were inoculated with 10 mL of a suspension containing *Meloidogyne exigua* in various developmental stages, after which the roots were covered with soil. 5 replicates were carried out.

TABLE 19

| Samples | Content (gram of thiodicarb per ha) | Content (gram of abamectin per ha) | Content of fertilizer |
|---|---|---|---|
| 1. Thiodicarb 350 SC (6.0 L/ha) | 2100 | 0 | 0 |
| 2. Abamectin 150 SC (1.0 L/ha) | 0 | 150 | 0 |
| 3. Fertilizer (2.0 L/ha) | 0 | 0 | See Note* |
| 4. Thiodicarb 350 SC (6.0 L/ha) + Fertilizer (2.0 L/ha) | 2100 | 0 | See Note* |
| 5. Abamectin 150 SC (1.0 L/ha) + Fertilizer (2.0 L/ha) | 0 | 150 | See Note* |
| 6. Control | 0 | 0 | 0 |

Note*:
Fertilizer composition:- 12% amino acids; 9.9% micronutrients (73.5 g/L zinc sulphate, 25.5 g/L disodium octaborate); 10% auxiliaries (including solvent, surfactant and stabilizer) in water.
After 15 and 30 days, the phytotoxicity effect was evaluated. No symptoms of phytotoxicity in coffee plants were observed.

The number of *Meloidogyne exigua* in various developmental stages in the plant roots was counted 45 days after application. The results are set out in Table 20 below.

TABLE 20

| Samples | Number of *Meloidogyne exigua* in various development stages in 10 grams of roots Day 45 (Days after application) |
|---|---|
| 1. Thiodicarb 350 SC (6.0 L/ha) | 91.26 |
| 2. Abamectin 150 SC (1.0 L/ha) | 110.41 |
| 3. Fertilizer (2.0 L/ha) | 150.13 |
| 4. Thiodicarb 350 SC (6.0 L/ha) + Fertilizer (2.0 L/ha) | 9.61 |
| 5. Abamectin 150 SC (1.0 L/ha) + Fertilizer (2.0 L/ha) | 11.23 |
| 6. Control | 267.08 |

As can be seen in the results set out in Table 20, the combination of an insecticide component (A) and a fertilizer component (B) provided significantly increased control of the nematodes, compared with either component (A) or component (B) applied alone and the Control. The results indicate a synergy between the insecticide component (A) and the fertilizer component (B).

Example 10—Cotton—*Meloidogyne incognita*

A nematode inoculum was prepared from a pure subpopulation of *Meloidogyne exigua* in tomato plants (*Solanum lycopersicom* L.) in clay recipients in a greenhouse. The subpopulation was previously identified based on morphological characters of perineal patterns, on the morphology of the mouth region, and on the isoenzymatic phenotype for esterasis.

3 mL samples of the compositions summarized in Table 21 below were applied uniformly on the soil and around the roots of the cotton plants at the indicated rate. Thereafter, the roots of the young cotton plants were inoculated with 10 mL of a suspension containing *Meloidogyne exigua* in various developmental stages, after which the roots were covered with soil. 5 replicates were carried out.

TABLE 21

| Samples | Content (gram of thiodicarb per ha) | Content (gram of fipronil per ha) | Content of fertilizer |
|---|---|---|---|
| 1. Fertilizer (2 L/ha) | 0 | 0 | See Note* |
| 2. Thiodicarb 350 SC (2 L/ha) + Imidacloprid 600 FS (0.4 L/ha) | 700 | 240 | 0 |
| 3. Thiodicarb 350 SC (2 L/ha) + Imidacloprid 600 FS FS (0.4 L/ha) + Fertilizer (2 L/ha) | 700 | 240 | See Note* |
| 4. Control | 0 | 0 | 0 |

Note*:
Fertilizer composition:- 12% amino acids; 10% micronutrients (zinc sulphate, sodium borate complex); 10% auxiliaries (including solvent, surfactant and stabilizer) in water.
After 15 and 30 days, the phytotoxicity effect was evaluated. No symptoms of phytotoxicity in cotton plants were observed.

The number of galls on 10 grams of root material was measured 45 days after application. The results are set out in Table 22 below.

TABLE 22

| Samples | Number of galls on 10 grams of roots Day 45 (Days after application) |
|---|---|
| 1. Fertilizer (2 L/ha) | 10.6 |
| 2. Thiodicarb 350 SC (2 L/ha) + Imidacloprid 600 FS (0.4 L/ha) | 9.4 |
| 3. Thiodicarb 350 SC (2 L/ha) + Imidacloprid 600 FS FS (0.4 L/ha) + Fertilizer (2 L/ha) | 1.6 |
| 4. Control | 15.2 |

As can be seen in the results set out in Table 22, the combination of an insecticide component (A) and a fertilizer component (B) provided significantly increased control of the nematodes, compared with either component (A) or component (B) applied alone and the Control. The results indicate a synergy between the insecticide component (A) and the fertilizer component (B).

Example 11—Soybean—*Heterodera glycines*

A nematode inoculum was prepared from a pure subpopulation of *Heterodera glycines* in soybean plants (*Glycine max* L.) in clay recipients in a greenhouse. The subpopulation was previously identified based on morphological characters of perineal patterns, on the morphology of the mouth region, and on the isoenzymatic phenotype for esterasis.

A suspension containing eggs and second stage juveniles (J2) was prepared from the soybean roots. 10 mL of the suspension was inoculated with eggplant and allowed to stand for 22 days. Thereafter, the eggplant was transplanted to pots and kept in the greenhouse. After 100 days, the roots of the eggplant were washed and ground in a blender with a solution of 0.5% sodium hypochlorite. The suspension was then passed through a sieve of 200 mesh (0.074 mm openings) on 500 (0.025 mm openings). The eggs and juveniles retained on the 500 mesh sieve were collected and washed.

3 mL samples of the compositions summarized in Table 23 below were applied uniformly on the soil and around the roots at the indicated rate. Thereafter, the roots of the young soybean plants were inoculated with 10 mL of a suspension containing *Heterodera glycines* in various developmental stages, after which the roots were covered with soil. 5 replicates were carried out.

TABLE 23

| Samples | Content (gram of thiodicarb per ha) | Content (gram of abamectin per ha) | Content of fertilizer |
|---|---|---|---|
| 1. Thiodicarb 350 SC (6.0 L/ha) + Abamectin 150 SC (1.0 L/ha) + Fertilizer (2.0 L/ha) | 2100 | 150 | See Note* |
| 2. Thiodicarb 350 SC (6.0 L/ha) + Abamectin 150 SC (1.0 L/ha) | 2100 | 150 | 0 |
| 3. Control | 0 | 0 | 0 |

Note*:
Fertilizer composition:- 12% amino acids; 10% micronutrients (zinc sulphate, sodium borate complex); 10% auxiliaries (including solvent, surfactant and stabilizer) in water.

The number of galls on 10 grams of roots of the soybean plants was counted 45 days after sowing. The results are set out in Table 24 below.

TABLE 24

| Samples | Number of galls on 10 grams of roots Day 45 (Days after sowing) |
|---|---|
| 1. Thiodicarb 350 SC (6.0 L/ha) + Abamectin 150 SC (1.0 L/ha) + Fertilizer (2.0 L/ha) | 0.0 |
| 2. Thiodicarb 350 SC (6.0 L/ha) + Abamectin 150 SC (1.0 L/ha) | 10.0 |
| 3. Control | 21.8 |

As can be seen in the results set out in Table 24, the combination of an insecticide component (A) and a fertilizer component (B) provided significantly increased control of the nematodes, compared with either component (A) applied alone and the Control.

Example 12—Corn—*Rotylenchulus reniformis*

A nematode inoculum was prepared from a pure subpopulation of *Rotylenchulus reniformis* in soybean plants (*Glycine max* L.) in clay recipients in a greenhouse. The subpopulation was previously identified based on morphological characters of perineal patterns, on the morphology of the mouth region, and on the isoenzymatic phenotype for esterasis.

3 mL samples of the compositions summarized in Table 25 below were applied uniformly on the soil and around the roots at the indicated rate. Thereafter, the roots of the young corn plants were inoculated with 10 mL of a suspension containing *Rotylenchulus reniformis* in various developmental stages, after which the roots were covered with soil. 5 replicates were carried out.

TABLE 25

| Samples | Content (gram of thiodicarb/ha) | Content (gram of fipronil/ha) | Content of fertilizer (per ha) |
|---|---|---|---|
| 1. Fertilizer (2 L/ha) | 0 | 0 | See Note* |
| 2. Thiodicarb 350 SC (4 L/ha) + Fipronil 250 SC (0.5 L/ha) | 1400 | 125 | 0 |
| 3. Thiodicarb 350 SC (4 L/ha) + Fipronil 250 SC (0.5 L/ha) + Fertilizer (2 L/ha) | 1400 | 125 | See Note* |
| 4. Control | 0 | 0 | 0 |

Note*:
Fertilizer composition:- 12% amino acids; 10% micronutrients (74 g/L zinc sulphate, 26 g/L disodium octaborate); 10% auxiliaries (including solvent, surfactant and stabilizer) in water.
After 15 and 30 days, the phytotoxicity effect was evaluated. No symptoms of phytotoxicity in the corn plants were observed.

The number of galls on 10 grams of root material was measured 45 days after application. The results are set out in Table 26 below.

TABLE 26

| Samples | Number of galls on 10 grams of roots Day 45 (Days after sowing) |
|---|---|
| 1. Fertilizer (2 L/ha) | 10.4 |
| 2. Thiodicarb 350 SC (4 L/ha) + Fipronil 250 SC (0.5 L/ha) | 1.2 |
| 3. Thiodicarb 350 SC (4 L/ha) + Fipronil 250 SC (0.5 L/ha) + Fertilizer (2 L/ha) | 0.0 |
| 4. Control (with nematode) | 17.2 |

As can be seen in the results set out in Table 26, the combination of an insecticide component (A) and a fertilizer component (B) provided significantly increased control of the nematodes, compared with either component (A) or component (B) applied alone and the Control. The results indicate a synergy between the insecticide component (A) and the fertilizer component (B).

The invention claimed is:

1. A composition comprising as component (A) at least one insecticide, the at least one insecticide including thiodicarb in an amount of 200 to 2500 g/ha, abamectin in an amount of 1 to 250 g/ha, imidacloprid in an amount of 5 to 400 g/ha, and/or fipronil in an amount of 1 to 250 g/ha; and as component (B) a fertilizer comprised of amino acids in an amount of 10 to 600 g/ha and micronutrients in an amount of 2 to 600 g/ha; wherein the amino acids include alanine, arginine, asparagine, aspartic acid, cysteine, glutamine, glutamic acid, glycine, histidine, isoleucine, leucine, lysine, methionine, phenylalanine, proline, serine, and threonine; the micronutrients include disodium octaborate and zinc sulphate; and wherein the composition controls nematodes in plants at a locus.

2. The composition according to claim 1, wherein component (A) is present in an amount of from 1% to 85% by weight of the composition.

3. The composition according to claim 2, wherein component (A) is present in an amount of from 10% to 75% by weight of the composition.

4. The composition according to claim 3, wherein component (A) is present in an amount of from 15% to 70% by weight of the composition.

5. The composition according to claim 1, wherein the at least one insecticide includes thiodicarb and/or abamectin.

6. The composition according to claim 5, wherein the at least one insecticide includes thiodicarb.

7. The composition according to claim 1, wherein the at least one insecticide includes abamectin and/or imidacloprid.

8. The composition according to claim 7, wherein the at least one insecticide includes abamectin.

9. The composition according to claim 1, wherein the at least one insecticide includes imidacloprid and/or thiodicarb.

10. The composition according to claim 9, wherein the at least one insecticide includes imidacloprid.

11. The composition according to claim 1, wherein the at least one insecticide includes fipronil and/or thiodicarb.

12. The composition according to claim 11, wherein the at least one insecticide includes fipronil.

13. The composition according to claim 1, wherein the component (A) comprises a single insecticide compound.

14. The composition according to claim 13, wherein the compound is fipronil or imidacloprid.

15. The composition according to claim 14, wherein the compound is fipronil or abamectin.

16. The composition according to claim 1, wherein the component (A) comprises a plurality of the at least one insecticide compounds.

17. The composition according to claim 1, wherein the component (B) is present in an amount of from 1% to 85% by weight of the composition.

18. The composition according to claim 17, wherein the component (B) is present in an amount of from 5% to 75% by weight of the composition.

19. The composition according to claim 1, wherein the amino acids comprise from 5% to 70% by weight of the component (B).

20. The composition according to claim 19, wherein the amino acids are present in an amount of approximately 12% by weight of the component (B).

21. The composition according to claim 1, wherein the micronutrients are present in an amount of from 1% to 30% by weight of the component (B).

22. The composition according to claim 21, wherein the micronutrients are present in an amount of from 1% to 20% by weight of the component (B).

23. The composition according to claim 22, wherein the micronutrients are present in an amount of from 5% to about 15% by weight of the component (B).

24. The composition according to claim 23, wherein the micronutrients are present in an amount of approximately 10% by weight of the component (B).

25. The composition according to claim 1, wherein the micronutrients further comprise ionic compounds containing ions of metals of Groups IA, IB, IIA, IIB, IIIA, VIA, VIB, VIIA, VIIB, and/or VIII of the Periodic Table.

26. The composition according to claim 25, wherein the ionic compounds contain ions of cobalt (Co), copper (Cu), iron (Fe), manganese (Mn), zinc (Zn), boron (B), halogens, molybdenum (Mo), alkali metals, and/or selenium (Se).

27. The composition according to claim 1, wherein the micronutrients further comprise ionic compounds containing ions selected from sulphates, borates, polyphosphates, phosphates and/or nitrates.

28. The composition according to claim 27, wherein the ionic compounds contain ions of perborates, pentaborates, triborates, tetraborates, octaborates and/or metaborates.

29. The composition according to claim 1, wherein the amino acids and the micronutrients are present in the composition in a total amount of both amino acids and micronutrients of from 5% to 95% by weight of the component (B).

30. The composition according to claim 29, wherein the amino acids and the micronutrients are present in the composition in a total amount of both amino acids and micronutrients of from 10% to 75% by weight of the component (B).

31. The composition according to claim 30, wherein the amino acids and the micronutrients are present in the composition in a total amount of both amino acids and micronutrients of from 10% to 50% by weight of the component (B).

32. The composition according to claim 1, wherein the amino acids and the micronutrients are present in a weight ratio of the amino acids and micronutrients in the range of from 20:1 to 1:20.

33. The composition according to claim 32, wherein the amino acids and the micronutrients are present in a weight ratio of the amino acids and micronutrients in the range of from 10:1 to 1:10.

34. The composition according to claim 33, wherein the amino acids and the micronutrients are present in a weight ratio of the amino acids and micronutrients in the range of from about 1.5:1 to about 1:1.5.

35. The composition according to claim 1, further comprising one or more adjuvants or components selected from extenders, carriers, solvents, surfactants, stabilizers, antifoaming agents, anti-freezing agents, preservatives, antioxidants, colorants, thickeners, solid adherents and inert fillers.

36. The composition according to claim 35, wherein the composition is a formulation selected from the group consisting of a water-soluble concentrate (SL), an emulsifiable concentrate (EC), an emulsion (EW), a micro-emulsion (ME), an oil-based suspension concentrate (OD), a flowable suspension (FS), a water-dispersible granule (WG), a water-soluble granule (SG), a water-dispersible powder (WP), a water soluble powder (SP), a granule (GR), an encapsulated granule (CG), a fine granule (FG), a macrogranule (GG), an aqueous suspo-emulsion (SE), a microencapsulated suspension (CS), a microgranule (MG), and a suspension concentrate (SC).

37. The composition according to claim 1, wherein the amino acids are present in an amount of approximately 12% by weight of the component (B) and the micronutrients are present in an amount of approximately 10% by weight of component (B).

* * * * *